(12) United States Patent
Chung

(10) Patent No.: US 8,850,131 B2
(45) Date of Patent: Sep. 30, 2014

(54) MEMORY REQUEST SCHEDULING BASED ON THREAD CRITICALITY

(75) Inventor: Jaewoong Chung, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 406 days.

(21) Appl. No.: 12/861,926

(22) Filed: Aug. 24, 2010

(65) Prior Publication Data

US 2012/0054760 A1    Mar. 1, 2012

(51) Int. Cl.
*G06F 12/00* (2006.01)
*G06F 9/52* (2006.01)

(52) U.S. Cl.
CPC .................................. *G06F 9/526* (2013.01)
USPC ............ 711/151; 711/150; 711/152; 711/163

(58) Field of Classification Search
USPC .................................. 711/150, 151, 152, 163
See application file for complete search history.

(56) References Cited

U.S. PATENT DOCUMENTS

| | | | |
|---|---|---|---|
| 6,378,051 B1 | 4/2002 | Henson et al. | |
| 6,909,691 B1 | 6/2005 | Goyal et al. | |
| 6,928,646 B1 | 8/2005 | James et al. | |
| 2001/0056456 A1 | 12/2001 | Cota-Robles | |
| 2002/0181440 A1 | 12/2002 | Norman et al. | |
| 2003/0145088 A1 | 7/2003 | Bhogal et al. | |
| 2003/0221071 A1 * | 11/2003 | McKenney et al. | 711/152 |
| 2004/0226015 A1 | 11/2004 | Leonard et al. | |
| 2007/0124793 A1 | 5/2007 | Wang et al. | |
| 2008/0222640 A1 | 9/2008 | Daly et al. | |
| 2008/0320323 A1 | 12/2008 | Brittain et al. | |
| 2009/0043991 A1 * | 2/2009 | Guo et al. | 712/216 |
| 2009/0049545 A1 * | 2/2009 | Nagpal et al. | 726/22 |
| 2009/0055580 A1 | 2/2009 | Moscibroda et al. | |
| 2009/0094478 A1 * | 4/2009 | Harper et al. | 714/3 |
| 2009/0216962 A1 | 8/2009 | Mutlu et al. | |
| 2009/0248976 A1 | 10/2009 | Rotithor | |
| 2009/0307691 A1 | 12/2009 | Moscibroda et al. | |
| 2010/0182624 A1 | 7/2010 | Murakami | |
| 2011/0276972 A1 | 11/2011 | Chung et al. | |
| 2011/0276973 A1 | 11/2011 | Chung et al. | |
| 2011/0276974 A1 | 11/2011 | Chung et al. | |

OTHER PUBLICATIONS

Chung, Jaewoong et al., "The Common Case Transactional Behavior of Multithreaded Programs," The Twelfth International Symposium on High-Performance Computer Architecture, Feb. 27, 2006, pp. 266-277.

Cloud Computing, Wikipedia, downloaded Oct. 23, 2009, 12 pages, http://en.wikipedia.org/wiki/Cloud_computing.

Intel, "Intel Core i7 Processor," downloaded Oct. 23, 2009, http://www.intel.com/products/processor/corei7/specifications.htm, 2 pages.

(Continued)

*Primary Examiner* — Gurtej Bansal
(74) *Attorney, Agent, or Firm* — Abel Law Group, LLP (57) ABSTRACT

A method includes scheduling a memory request requested by a thread executing on a processing system. The scheduling is based on at least one of a number of critical sections being executed on the processing system by the thread and a number of other threads executing on the processing system being blocked from execution on the processing system by execution of the thread. In at least one embodiment of the invention, the thread is associated with a first application of a plurality of applications executing on the processing system and the scheduling is further based on an indicator of application priority.

22 Claims, 8 Drawing Sheets

(56) References Cited

OTHER PUBLICATIONS

Kim, Yoongu et al., "ATLAS: A Scalable and High-Performance Scheduling Algorithm for Multiple Memory Controllers," HPCA, Jan. 2010, 12 pages.

Micron DDR2 SDRAM, 2006, 130 pages.

Moscibroda, Thomas and Mutlu, Onur, "Memory Performance Attacks: Denial of Memory Service in Multi-Core Systems," Technical Report MSR-TR-2007-15, Microsoft Research, 2007, pages Abstract, 1-20 http://www.research.microsoft.com.

Mutlu, Onur and Moscibroda, Thomas, "Stall-Time Fair Memory Access Scheduling for Chip Multiprocessors," Proceedings of the 40th International Symposium on Microarchitecture (MICRO), Dec. 2007, 13 pages.

Mutlu, Onur, and Moscibroda, Thomas, "Parallelism-Aware Batch Scheduling: Enhancing Both Performance and Fairness of Shared DRAM Systems," ISCA-36, Jun. 2008, pp. 1-12.

Nesbit, Kyle J. et al., "Fair Queuing Memory Systems," Proceedings of the 39th Annual IEEE/ACM International Symposium on Microarchitecture, 2006, 12 pages.

Rai, Idris A., et al., "Performance Analysis of LAS-based Scheduling Disciplines in a Packet Switched Network," SIGMETRICS/Performance '04, Jun. 12-16, 2004, 12 pages.

Righter, Rhonda and Shanthikumar, J. George, "Scheduling Multiclass Single Server Queueing Systems to Stochastically Maximize the Number of Successful Departures," Probability in the Engineering and Informational Sciences, Cambridge University Press, 3:323-333, 1989.

Rixner, Scott et al, "Memory Access Scheduling," ISCA-27 (2000), pp. 1-11.

Wikipedia, "Critical Section," Jul. 2, 2010, pp. 1-5, http://en.wikipedia.org/wiki/Critical_section.

Wikipedia, "Lock (computer science)," Jul. 2, 2010, pp. 1-7, http://en.wikipedia.org/wiki/Lock_(computer_science).

\* cited by examiner

MEMORY REQUEST SCHEDULING BASED ON THREAD CRITICALITY

BACKGROUND

1. Field of the Invention

The invention is related to computing systems and more particularly to memory request scheduling in computing systems.

2. Description of the Related Art

In a typical computing system, a memory controller is an intermediary between a processor (e.g., central processing unit, digital signal processor, graphics processor, processor core, or core) and main memory (e.g., synchronous dynamic random access memory, i.e., SDRAM) that prioritizes and schedules memory requests (e.g., reads and writes from and to main memory, respectively). The memory controller schedules memory requests by prioritizing memory requests, translating the memory requests into a sequence of memory commands, and issuing to memory the sequence of memory commands associated with a highest priority memory request. A typical processing system (e.g., a chip multiprocessor system) executes one or more threads (i.e., threads of execution, tasks, or processes) concurrently on one or more processors. Accordingly, multiple threads executing on the one or more processors may contend with each other for memory bandwidth. Thus, there is a need to facilitate memory request scheduling in processing systems.

SUMMARY OF EMBODIMENTS

In at least one embodiment of the invention, a method includes scheduling a memory request requested by a thread executing on a processing system. The scheduling is based on at least one of a number of critical sections being executed on the processing system by the thread and a number of other threads executing on the processing system being blocked from execution on the processing system by execution of the thread. In at least one embodiment of the invention, the thread is associated with a first application of a plurality of applications executing on the processing system and the scheduling is further based on an indicator of application priority.

In at least one embodiment of the invention, a processing system includes a memory request buffer operable to store a memory request requested by a thread executing on the processing system. The memory request buffer is operable to store an indicator associated with the memory request. The indicator is based on at least one of a number of critical sections being executed on the processing system by the thread and a number of other threads executing on the processing system being blocked from execution on the processing system by execution of the thread. The processing system includes a scheduler operative to schedule a memory request from the memory request buffer to a memory based on the indicator.

In at least one embodiment of the invention, a tangible computer-readable medium encoding instructions includes a first set of instructions operable on a processing system to maintain a data structure including a first entry corresponding to a thread. The first entry includes an association to at least a second entry of the data structure. The indicator is based on at least one entry of the data structure. The tangible computer-readable medium encoding instructions includes a second set of instructions operable on the processing system to determine, based on the data structure, an indicator associated with a memory request and based on at least one of the number of critical sections being executed on the processing system by the thread and a number of other threads executing on the processing system being blocked from execution on the processing system by execution of the thread.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
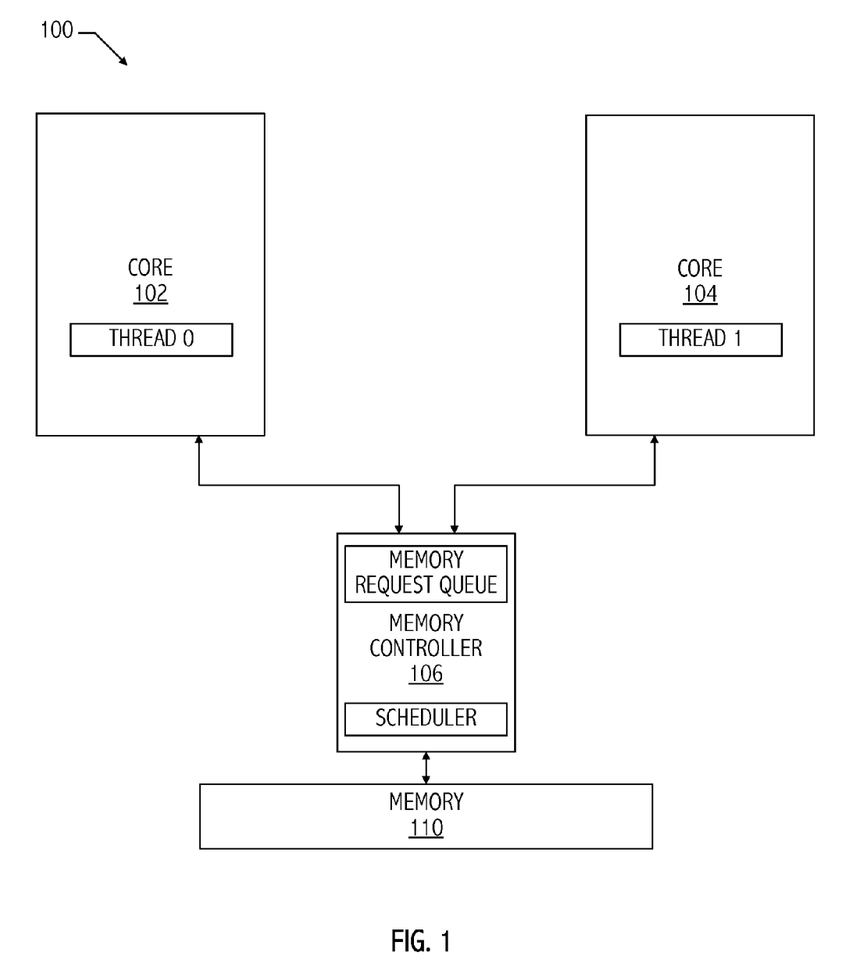
FIG. 1 illustrates a functional block diagram of an exemplary processing system.

Referring to FIG. 1, in an exemplary processing system (e.g., system 100), multiple threads (e.g., thread 0 and thread 1) execute on the system concurrently on one or more processors (e.g., core 102 and core 104). A memory controller (e.g., memory controller 106) provides the one or more processors access to a particular portion of memory space (e.g., memory 110). Memory controller 106 stores memory requests received from cores 102 and 104 in at least one memory request queue. A scheduler of memory controller 106 schedules memory requests received from thread 0 and thread 1 and stored in the memory request queue to memory 110.

Figure 2:
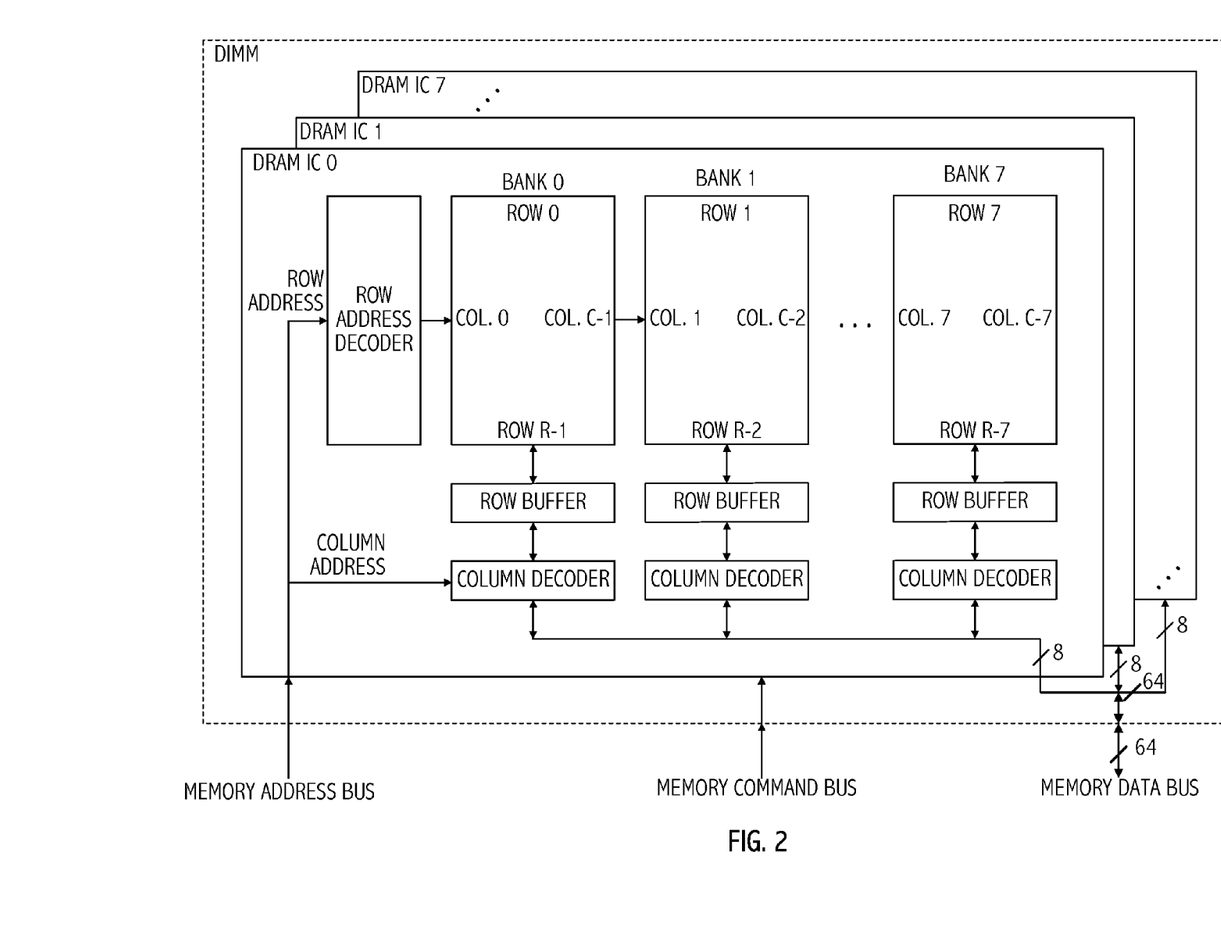
FIG. 2 illustrates a functional block diagram of an exemplary memory system consistent with at least one embodiment of the invention.

Referring to FIG. 2, an exemplary memory system (e.g., memory 110) includes one or more memory integrated circuits (e.g., one or more DRAM integrated circuits). In at least one embodiment, the memory system includes multiple memory integrated circuits, which are accessed in parallel (e.g., configured as a dual in-line memory module, i.e., DIMM). In at least one embodiment of the memory system, each memory integrated circuit includes a data interface (e.g., 8-bit data interface) that is combined with data interfaces of other memory integrated circuits to form a wider data interface (e.g., 64-bit data interface). In at least one embodiment of the memory system, each memory integrated circuit includes multiple independent memory banks, which can be accessed in parallel. In at least one embodiment of the memory system, each memory bank includes a two-dimensional array of DRAM (i.e., dynamic random access memory) cells, including multiple rows and columns. A location of the memory is accessed using a memory address including bank, row, and column fields. In at least one embodiment of the memory system, only one row in a bank can be accessed at a time and the row data is stored in a row buffer dedicated to that bank. An activate command moves a row of data from the memory array into the row buffer. Once a row is in the row buffer, a read or write command can read/write data from/to the associated memory address. Thus, the latency of a memory command depends on whether or not a corresponding row is in a row buffer of an associated memory bank.

If the contents of a memory address are in the row buffer (i.e., the memory address hits the row buffer), then a memory controller only needs to issue a read or write command to the memory bank, which in an embodiment has a memory access latency of $t_{CL}$ or $t_{WL}$, respectively. If the contents of the memory address are not present in the row buffer (i.e., the memory address misses the row buffer), then the memory controller needs to precharge the row buffer, issue an activate command to move a row of data into the row buffer, and then issue a read or write command to the memory bank, which, in an embodiment, has an associated memory access latency of $t_{RCD}+t_{CL}+t_{RP}$ or $t_{RCD}+t_{WL}+t_{RP}$, respectively. Note that the memory architecture of FIG. 2 is exemplary only and the teachings described herein apply to systems including other memory architectures.

Figure 3A:
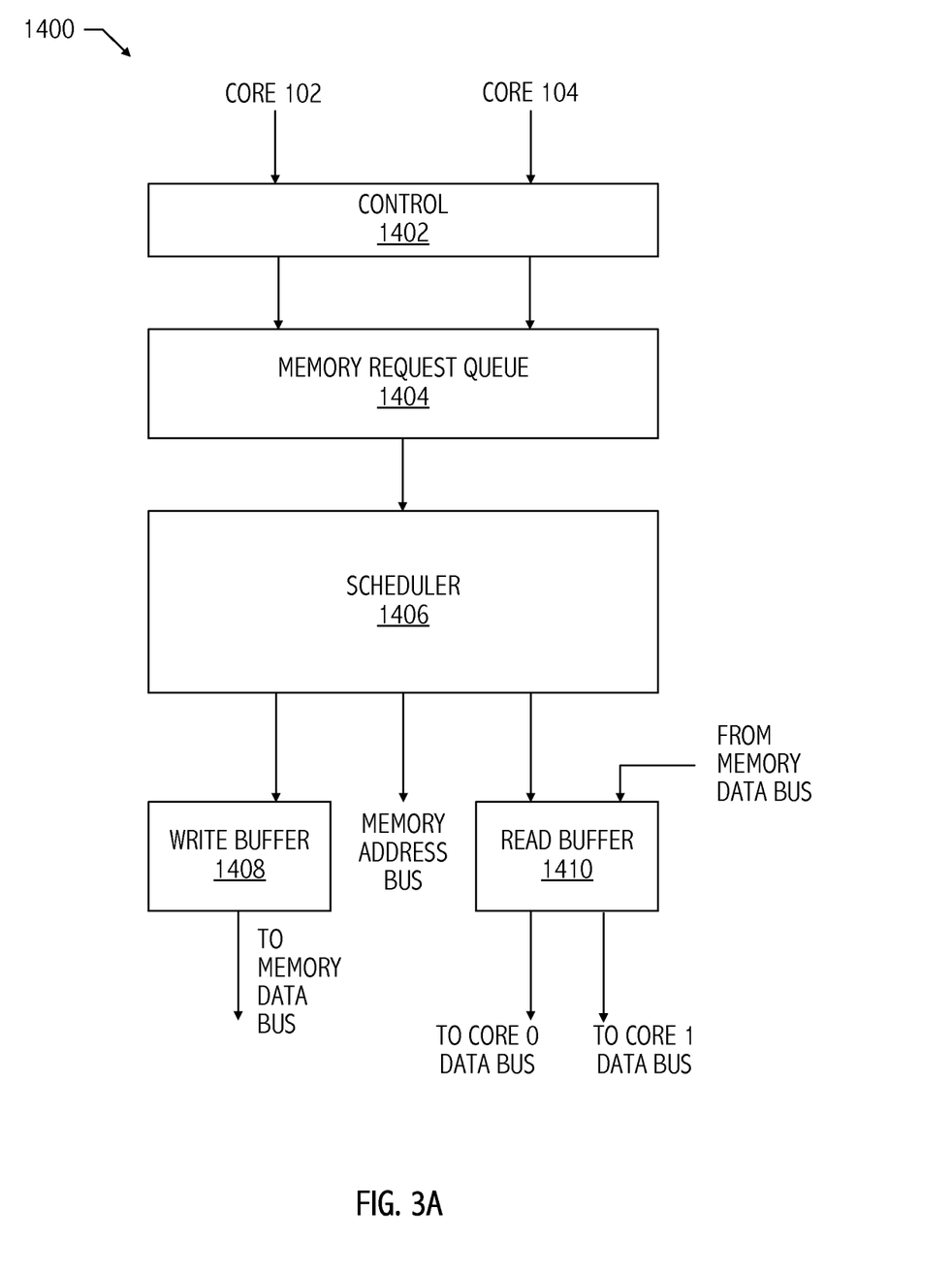
FIGS. 3A and 3B illustrate functional block diagrams of exemplary memory controllers consistent with various embodiments of the invention.
Figure 3B:
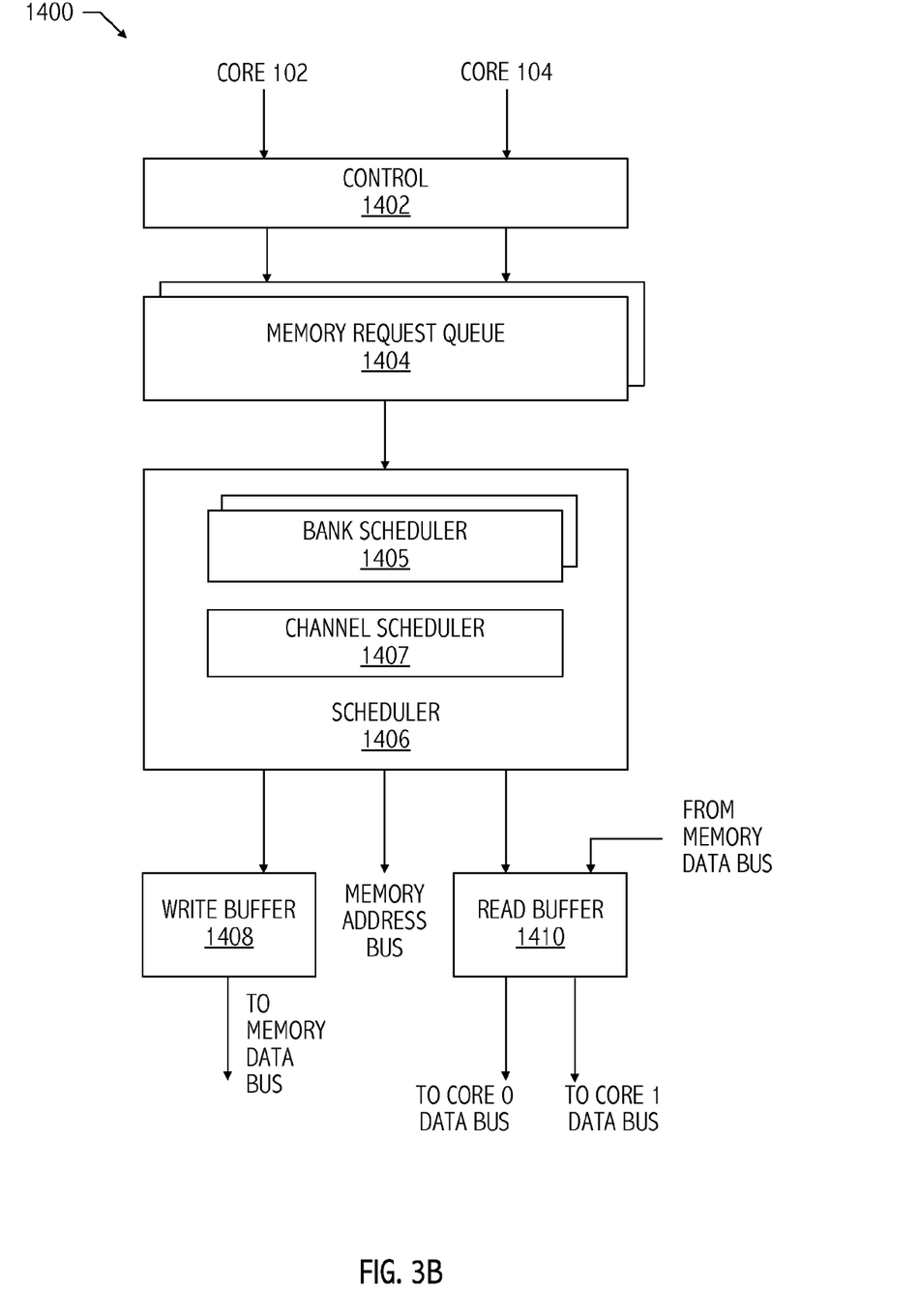

Referring to FIGS. 3A and 3B, an exemplary memory controller (e.g., memory controller 1400) receives memory requests from one or more processors (e.g., core 102 and core 104). Control circuit 1402 assigns an arrival time to each memory request and stores the arrival time with the memory request (e.g., request type and request identifier) in memory request queue 1404. Scheduler 1406 prioritizes the memory requests and schedules the memory requests by reordering the memory requests into one or more sequences of memory commands based on the priorities. Scheduler 1406 sequentially executes the memory commands via a memory address bus and a memory data bus. Referring to FIG. 3B, in at least one embodiment, the portion of memory serviced by memory controller 1400 includes multiple memory banks, memory request buffer 1404 includes a request buffer for memory requests corresponding to each memory bank, and scheduler 1406 includes a bank scheduler for each memory bank (e.g., bank schedulers 1405) and a channel scheduler (e.g., channel scheduler 1407).

Still referring to FIG. 3B, in at least one embodiment of memory controller 1400, a bank scheduler 1405 selects pending memory requests with the highest priority from a corresponding memory request queue and generates a sequence of memory commands to read or write the request data to or from the memory, respectively. In at least one embodiment, bank scheduler 1405 monitors timing constraints for a corresponding memory bank to ensure that a sequence of memory commands complies with memory specifications. If a memory command is ready with respect to the memory specifications, then bank scheduler 1405 sends the command to channel scheduler 1407. In at least one embodiment, channel scheduler 1407 reorders and/or interleaves memory requests in priority order (e.g., highest priority commands first) from each of the bank schedulers 1405 into memory commands, which are issued on the memory address bus and signal write buffer 1408 and read buffer 1410. Channel scheduler 1407 sends an acknowledgement to a corresponding bank scheduler 1405 when channel scheduler 1407 issues a memory command and bank scheduler 1405 updates a state accordingly. Channel scheduler 1407 also monitors the state of the memory address and data buses and bank timing constraints to reduce or eliminate channel scheduling conflicts and timing constraint violations.

In at least one embodiment of memory controller 1400, bank schedulers 1405 and channel scheduler 1407 use the same priority policies. Referring to FIG. 3A, in at least one embodiment, memory controller 1400 services only one memory bank and scheduler 1406 does not include bank schedulers 1405 and channel scheduler 1407. Accordingly, as referred to herein, a "scheduler" is any one of a bank scheduler, a channel scheduler, a scheduler from a memory controller servicing only one memory bank, or other suitable memory request scheduler unless otherwise specified. In addition, note that memory controller 1400 of FIG. 3A and memory controller 1400 of FIG. 3B are exemplary only and techniques described herein are applicable to other memory controller architectures.

Referring back to FIG. 1, processing system 100 implements synchronization techniques to enforce limits on access to memory when multiple threads (i.e., threads, tasks, or processes, e.g., thread 0 and thread 1) execute concurrently. In at least one embodiment, system 100 implements locks to enforce concurrency control policies. For example, each thread acquires a lock before accessing shared data memory 110. In addition, an exemplary operating system uses locks to protect other shared hardware resources, e.g., a network interface. In at least some embodiments of system 100, attempting unauthorized access to a locked resource triggers an exception in the entity (e.g., core 102 or core 104) attempting to make the access. A typical locking design blocks execution of a thread requesting the lock until the thread is allowed to access the locked resource (e.g., particular memory locations). In general, the synchronization technique is efficient if threads are only likely to be blocked for a short period of time since it reduces overhead of operating system process rescheduling. If a lock is held for a long period of time, such locking techniques can result in process rescheduling, which may be wasteful.

As referred to herein, a critical section is a portion of code (i.e., sequence of instructions) that can be executed by only one thread at a time. An exemplary critical section accesses a shared resource (e.g., shared data structure, memory location, or device) that must not be concurrently accessed by more than one thread of execution. Multiple threads may communicate with each other and access shared data without data races through the use of critical sections, which are typically protected by locks. In typical concurrent programming techniques, a critical section will terminate in a fixed time and a thread will have to wait for a fixed time to enter the critical section. Critical sections may be implemented by any suitable technique, which may vary with the operating system. An exemplary technique for implementing critical sections prevents any change of processor control inside a critical section. On a single-processor system, this may be done by disabling interrupts upon entry into a critical section, avoiding system calls that can cause a context switch while inside the critical section, and restoring interrupts to their prior state upon exiting the critical section. Accordingly, a first thread of execution entering a critical section will prevent another thread, including an interrupt, from obtaining control of the processor and therefore from entering the critical section until the first thread leaves its critical section. In at least one embodiment of processor 100, use of semaphores and/or other techniques allow other threads to gain control of the processor and execute other code while a thread executes a critical section.

Since only one thread can enter a critical section at a time and while threads are being blocked, at least some system resources (e.g., one or more processors of a multiprocessor system) are idle that could otherwise be used to process instructions, it is important for the system to execute the critical section efficiently and relatively quickly. The following issues may degrade system performance: first, an increase in execution time of a critical section of a thread increases the likelihood that the thread blocks another thread attempting to enter that critical section; second, increases in the time that a thread holds a lock that protects a critical section increase the time that other threads wait to enter the critical section; third, the impact of the first and second issues is exacerbated if critical sections are nested, e.g., if a thread waiting to enter a critical section is holding a lock that protects yet another critical section that other threads are waiting to enter.

Figure 4:
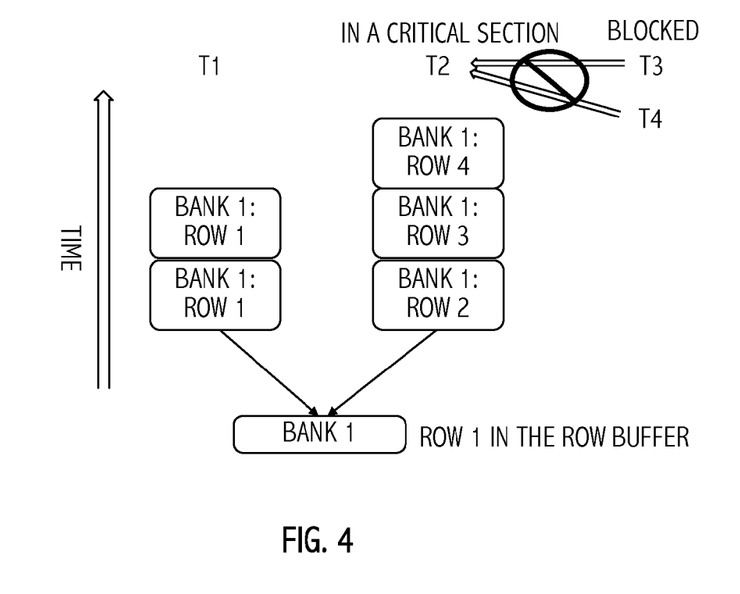
FIG. 4 illustrates performance issues with first-ready, first-come, first-served scheduling and parallelism aware batch scheduling of memory requests.

Typical memory scheduling mechanisms are not aware of those performance issues and may inadvertently slow down execution of a thread in a critical section. For example, referring to FIG. 4, if an exemplary application executes four threads (e.g., T1, T2, T3, and T4), T1 is not in a critical section, T2 is in a critical section, and T3 and T4 are blocked by T2 and are waiting to enter the critical section. Memory requests from T1 and T2 are queued in the memory controller. If the memory controller uses a typical scheduling technique, e.g., first-ready first-come first-served (FRFCFS), T1's requests are handled first since FRFCFS prioritizes the memory requests that hit a row buffer. Thus, the memory scheduler slows down T2 by making memory requests from thread T2 wait longer in the memory request queue. Instead of using FRFCFS, if the memory controller uses parallelism aware batch scheduling (PARBS), memory requests from thread T1 are also handled first since PARBS prioritizes the memory requests of a thread that has the smallest number of requests in the queue according to the shortest-job-first (SJF) policy. As a result, PARBS also slows down T2. Thus, since typical memory scheduling techniques are not aware of interactions among multiple threads in an application and schedule each thread as if their executions are independent of each other, those memory scheduling techniques inadvertently schedule memory requests in ways that degrade performance.

Figure 5:
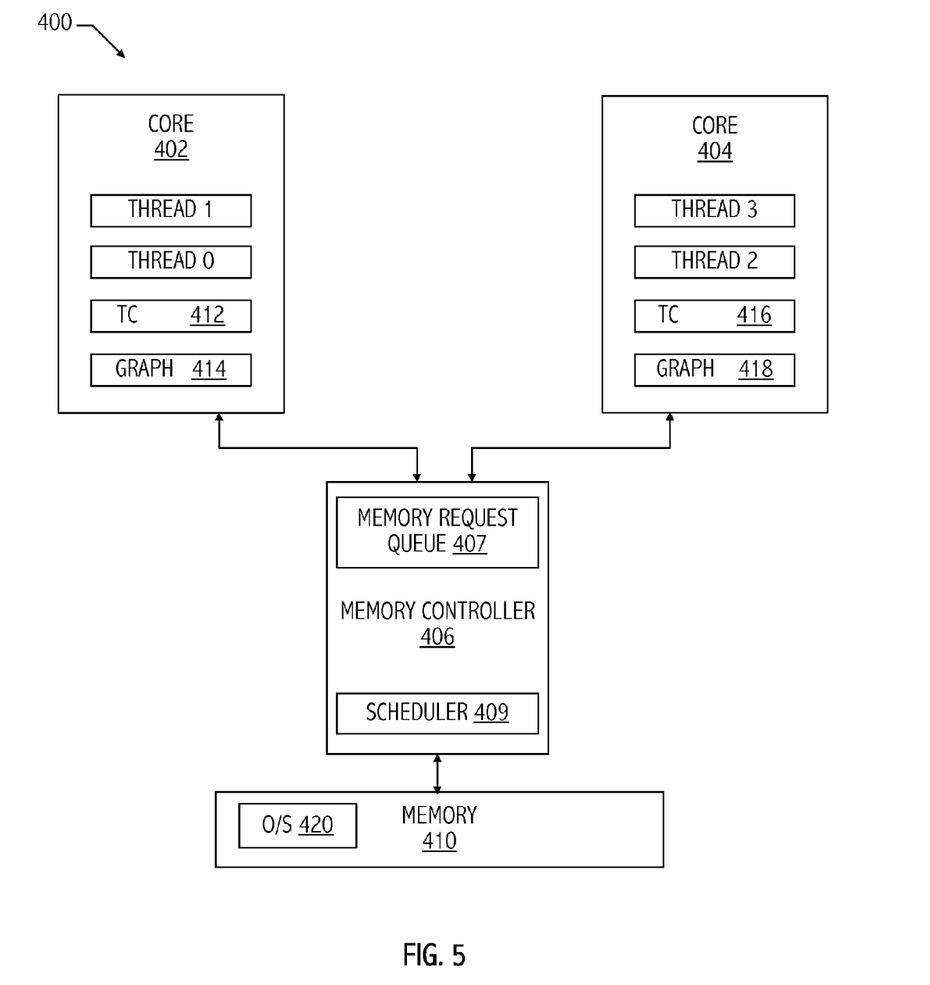
FIG. 5 illustrates an exemplary processing system consistent with at least one embodiment of the invention.

Referring to FIG. 5, a processing system (e.g., processing system 400) implements a memory request scheduling technique that is aware of concurrency controls and schedules memory requests based on thread criticality. Criticality of a thread (i.e., thread criticality) increases when the thread executes a critical section and/or increases when the thread executing a critical section blocks another thread waiting to enter the critical section. Hardware may be unable to recognize when a thread executes in a critical section. For example, a critical section is typically protected by a lock, which is implemented using basic atomic primitives (e.g., compare and swap, i.e., CAS). However, hardware may not be able to distinguish locks just from observing those primitives. Thus, software and hardware techniques are used to provide hardware primitives that enable software to provide the memory controller with thread criticalities. Then, the memory controller schedules memory requests according to criticalities of those threads that created the requests.

Figure 6:
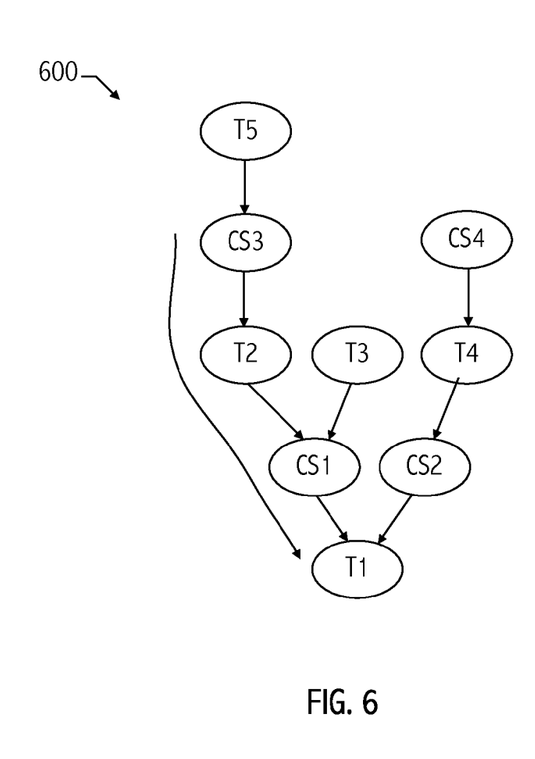
FIG. 6 illustrates an exemplary criticality graph consistent with at least one embodiment of the invention.

Referring to FIG. 6, in at least one embodiment of processing system 400, an operating system or other run-time system, maintains a data structure corresponding to each application executing on the system. The data structure includes information regarding which thread is in the critical section and which threads are waiting for the critical section. The critical section collects the information and enters it into a corresponding data structure whenever a thread attempts to enter the critical section. In at least one embodiment of system 400, the existing data structures used by the operating system or other runtime system to manage threads and critical sections are augmented with a pointer to the corresponding node in the criticality graph to quickly access the criticality values of threads and critical sections graph. Note that the criticality graph is an exemplary data structure and threads and associations to critical sections may be maintained in other suitable forms (e.g., table or list with entries corresponding to threads and critical sections and associations thereof).

In at least one embodiment of processing system 400, the criticality of a particular thread of an application is determined based on a data structure corresponding to the application from the number of critical sections the thread is executing and the number of other threads waiting to enter those critical sections. In exemplary criticality graph 600, nodes Tx represent threads (e.g., threads 1, 2, 3, 4, and 5) and nodes CSx represent critical sections (e.g., critical sections 1, 2, 3 and 4). An arrow from node CSx to node Tx indicates that node Tx is executing in critical section CSx. An arrow from node Tx to node CSx indicates that thread Tx is waiting to enter critical section CSx. In at least one embodiment of the scheduling technique, the criticality of a particular node is defined as the number of nodes, (e.g., node Tx and/or node CSx), that directly or indirectly point to the particular node. The criticality of a thread is the criticality of a corresponding node Tx in a criticality graph.

In at least one embodiment of processor 400, an indicator of the criticality of a thread is determined to account for the three performance issues described above by increasing the thread criticality whenever thread execution can cause one of those problems. For example, thread T1 executes in critical section CS1 and critical section CS2, which is related to the first issue, that as the length of time that thread T1 stays in either of those critical sections increases, the likelihood increases that thread T1 blocks a thread from entering critical section CS1 or critical section CS2. Accordingly, the criticality graph includes node T1, which is pointed to by node CS1 and CS2. A determination of thread criticality increments a criticality indicator for each of the CSx nodes directly connected to node T1. For example, the thread criticality for thread T1 increases by two. The increase in thread criticality for thread T1 may reduce the time thread T1 spends in critical sections CS1 and CS2 by increasing the priority of thread T1 for each critical section in which thread T1 executes.

In at least one embodiment of the scheduling technique, the thread criticality indicator accounts for the second performance issue described above, i.e., the slowdown of a thread in a critical section may lengthen the waiting time of other threads to enter the critical section. Still referring to FIG. 6, for an exemplary thread T1, this issue may occur by staying in critical sections CS1 and CS2 and blocking execution of threads T2 and T3, which are waiting for critical section CS1, and blocking execution of thread T4, which is waiting for critical section CS2. The criticality graph illustrates this scenario by including pointers from nodes T2 and T3 to node CS1 and including a pointer from node T4 to node CS2. A determination of thread criticality for a thread Tx counts the Ty nodes pointing directly to CSx, which points to thread Tx. That is, the determination of thread criticality increments the thread criticality for each node Ty that indirectly points to node Tx. Thus the thread criticality accounts for threads blocked by another thread. For example, the thread criticality for thread T1 increases by three (i.e., increases by one for each of blocked threads T2, T3, and T4). The increase in thread criticality for thread T1 may reduce the time for thread T1 to exit critical section CS1 and critical section CS2 and unblock threads T2, T3, and T4.

In at least one embodiment of the scheduling technique, the thread criticality indicator accounts for the third performance issue described above, i.e., that the first two issues are cascaded and magnified if the blocked thread holds a lock that may block yet another thread. For example, the criticality graph of FIG. 6 illustrates this cascading effect for thread T1, since threads T2 and T4 are waiting to execute critical section CS3 and critical section CS4, respectively, and thread T5 is blocked by T2, which holds a lock on critical section CS3. A determination of thread criticality for a thread Tx counts the CSx nodes and the Ty nodes indirectly connected to Tx (e.g., nodes CS3, CS4, and T5). That is, the determination of thread criticality increments the thread criticality of thread Tx for each node Ty that indirectly points to node Tx. For example, the thread criticality for thread T1 increases by three (i.e., incremented by one for each of node CS3, CS4, and T5). Thus, the increase in thread criticality for thread T1 increases the priority of thread T1 to unblock T5 faster than otherwise. Note that in at least one embodiment of system 400, thread criticality increases only when one or more threads are being blocked and not for executing critical sections alone. In another embodiment of system 400, thread criticality increases only for execution of a critical section and is not increased further for actually blocking execution of another thread.

Referring back to FIG. 5, in at least one embodiment of system 400, a thread criticality graph is maintained for each application by software executing on system 400 (e.g., the criticality graph is maintained by the operating system or other runtime system). The thread criticality of a node is recalculated when a pointer is added or removed in the criticality graph. For example, the software adds a pointer to the graph from a critical section node CSx to a thread node Tx when the corresponding thread is inserted into a waiting queue for the critical section. The software removes the pointer when the thread enters the critical section CSx. The software adds a pointer to the graph from a thread node Tx to a critical section node CSx when a thread enters the critical section. The software removes the pointer when the thread exits the critical section. Whenever one of those events occurs, the software recalculates the criticality of the destination node by adding or subtracting the criticality of the source node. In addition, the recalculation is propagated along the pointers starting from the destination node. For example, referring back to FIG. 6, if the criticality of CS3 is recalculated, the criticalities of T2, CS1, and T1 are also recalculated based on the new value of criticality of critical section CS3. In general, the software can quickly recalculate those criticalities because 1) the nesting depth of critical sections are typically shallow, which means that the depth of the graph is shallow and the number of nodes to be recalculated is small, and 2) the recalculation per node is easily done by a single addition or subtraction operation (e.g., a single increment or decrement operation).

Referring back to FIG. 5, in at least one embodiment of system 400, data structures used by an existing operating system or runtime system to manage threads and critical sections are augmented to include a pointer to a corresponding node in the thread criticality graph. The pointer facilitates quick access to criticality values associated with critical sections and/or threads. In at least one embodiment of system 400, cores 402 and 404 each include a thread criticality register (e.g., TC 412 and TC 416) that is operable to store an indicator of criticality of a thread currently executing on the corresponding core. In at least one embodiment, a processor sets the value of the thread criticality register when a thread is scheduled to execute on the core. The software updates the thread criticality register when the thread enters or exits a critical section. In at least one embodiment, system 400 updates the thread criticality register in response to context switches. For example, system 400 restores a last value of the thread criticality register associated with a thread when switching the context of a processor back to execution of the thread, which had been previously switched out. In other embodiments of a processing system, a processor updates the thread criticality register at other suitable junctures. In at least one embodiment of system 400, since the criticality graph can be changed by other cores, the value in the thread criticality register and the value in the criticality graph can differ at a particular point in time. Note that it is not necessary for the thread criticality register and a thread criticality entry in the criticality graph corresponding to a currently executing thread to be consistent at all times.

In at least one embodiment of system 400, cores 402 and 404 communicate the criticality value of a corresponding one of thread criticality registers 412 and 416 when a memory request propagates through the memory hierarchy. For example, once a memory request misses a cache, the core sends the memory request to memory request queue 407. In at least one embodiment, memory request queue 407 stores memory request entries that include corresponding thread criticality values. In at least one embodiment, memory controller 406 uses the thread criticality value associated with a particular memory request to schedule that memory request. For example, scheduler 409 and/or memory controller 406 assign one or more priority values to the memory request based on the thread criticality value and schedule the memory request based on the priority assigned to the memory request.

Figure 7:
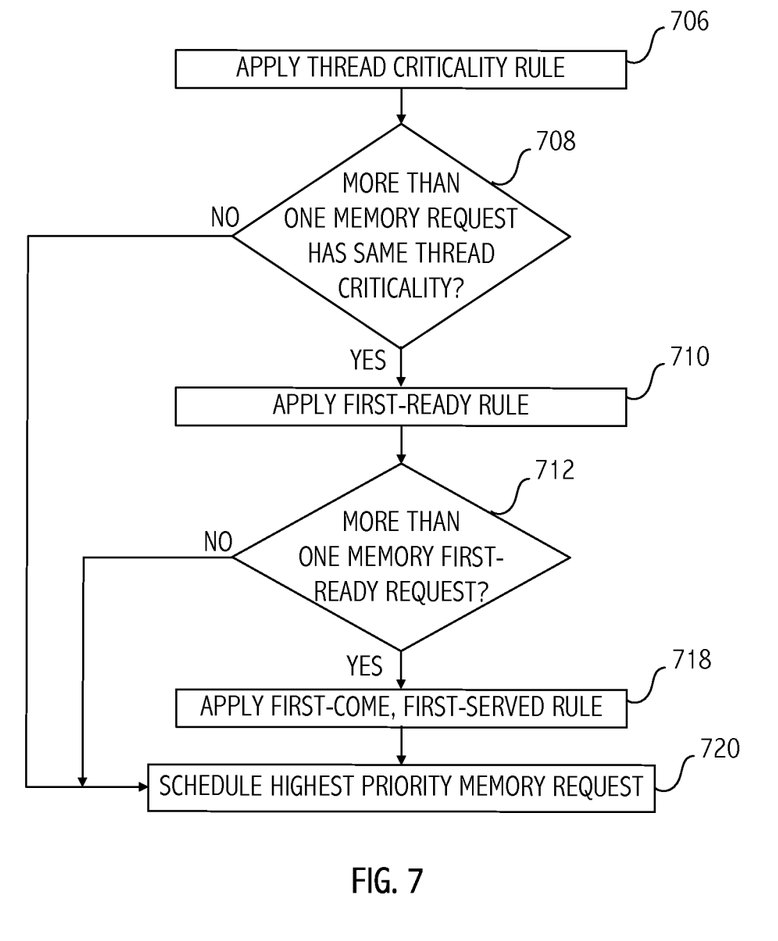
FIG. 7 illustrates information and control flows associated with memory request scheduling based on thread criticality consistent with at least one embodiment of the invention.

Referring to FIG. 7, in at least one embodiment, memory controller 406 schedules memory requests by first applying a thread criticality rule, as described above, i.e., the memory controller schedules a memory request of a thread with a higher thread criticality before a memory request of a thread with a lower thread criticality (706). In at least one embodiment, if multiple memory requests are associated with the same priority under the thread criticality rule (708), then the memory controller applies a first-ready rule to prioritize between those memory requests, i.e., a memory request that hits a row buffer is given higher priority over a memory request that misses a row buffer (710). In at least one embodiment, if two or more memory requests associated with the same priority under the thread criticality rule also have the same priority under the first-ready rule (712), then the memory controller applies a first-come, first-served rule to prioritize between those memory requests, i.e., a memory request received earlier is prioritized over a memory request received later (718). Once the memory controller identifies the memory request associated with the highest priority, the memory controller schedules the associated memory access (720). Note that the order and type of prioritization rules of FIG. 7 are exemplary only and other prioritization rules may be used consistent with techniques described herein.

In at least one embodiment, a memory controller implementing the thread criticality rule described herein accelerates a thread in a critical section by prioritizing the memory requests from that thread. If one or more other threads are being blocked by the thread in the critical section, memory controller 406 further increases the priority of the memory request(s) from the thread in the critical section to accelerate an exit of the critical section by the thread in the critical section, which unblocks those other threads. In at least one embodiment of memory controller 406, if no threads of an application are in a critical section, the thread criticality rule is not applied and memory controller 406 schedules memory requests using another scheduling rule (e.g., first-ready, first-come first-served, or other suitable scheduling rule).

Figure 8:
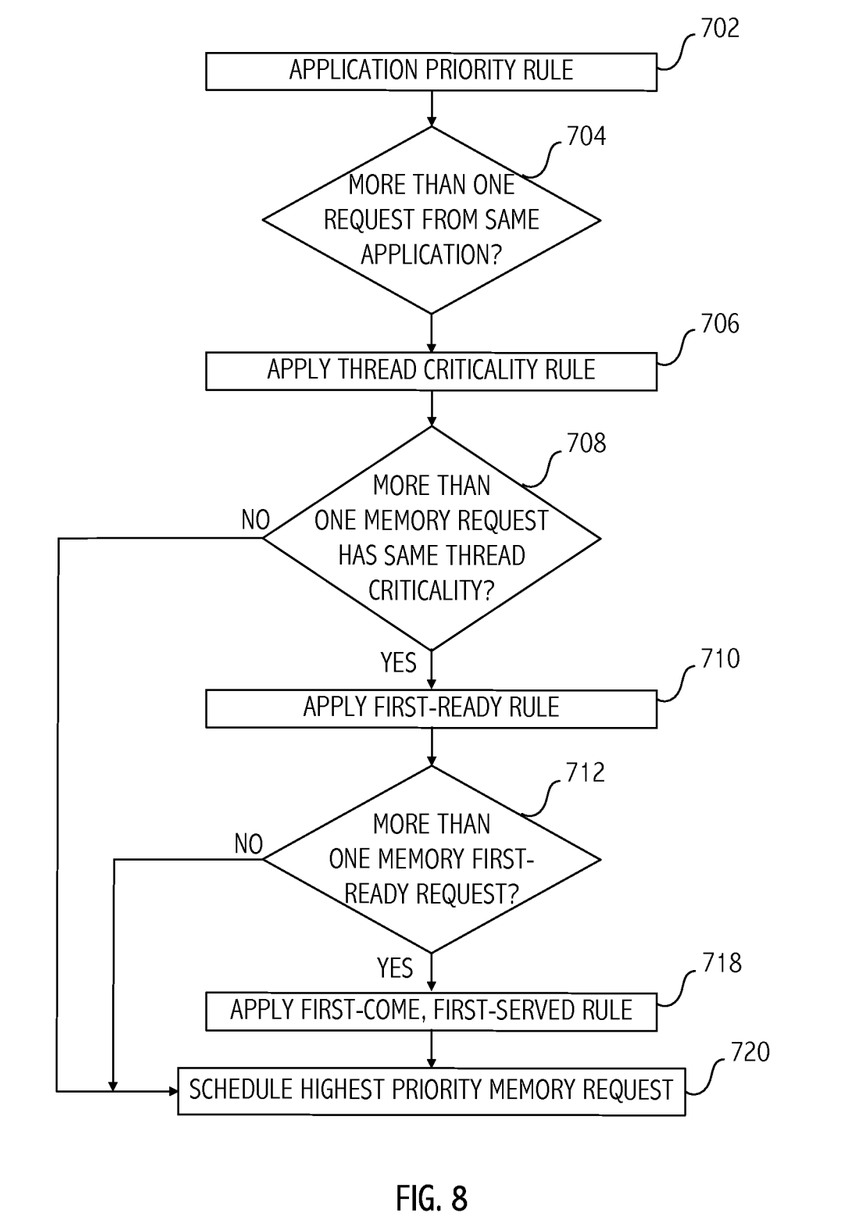
FIG. 8 illustrates information and control flows associated with memory request scheduling based on application priority and thread criticality consistent with at least one embodiment of the invention.

If multiple applications concurrently execute on a processing system, a starvation issue may arise, e.g., from a denial-of-service attack by a malicious application that generates a pathological memory access pattern against the thread criticality memory scheduling technique. For example, a malicious application can intentionally increase thread criticality by generating one or more bogus threads to be blocked by an actual thread of the malicious application. By artificially increasing thread criticality, the malicious application causes starvation of threads from other applications executing on the processing system. In at least one embodiment, memory controller 406 addresses the potential starvation issue by tagging memory requests with additional information, e.g., entries of the memory request queue are augmented to include application priority information, which is set by the operating system. The memory request scheduling technique uses the application priority information to implement an additional rule, i.e., an application priority rule. Referring to FIG. 8, in at least one embodiment, memory controller 406 schedules memory requests by first applying the application priority rule (702), i.e., a memory request associated with an application with a higher priority is scheduled before a memory request from an application with a lower priority. If the memory request queue includes more than one request having the same application priority memory (704), controller 406 applies the thread criticality rule, first-ready rule, and first-come, first-served rule, as described above with respect to FIG. 7. In an embodiment of memory controller 406 that applies the application priority rule, as described with respect to FIG. 8, the memory controller uses thread criticality only to determine scheduling order among threads of the same application when applications are given different priorities. This technique reduces or eliminates the starvation issue described above since the thread criticality rule does not allow a thread of an application with a first application priority to steal memory bandwidth from a thread of another application with a different application priority.

Structures described herein may be implemented using software executing on a processor (which includes firmware) or by a combination of software and hardware. Software, as described herein, may be encoded in at least one tangible computer-readable medium. As referred to herein, a tangible computer-readable medium includes at least a disk, tape, or other magnetic, optical, or electronic storage medium.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., HDL, Verilog, GDSII data) of such circuits, systems, and methods, all as described herein, and as defined in the appended claims. In addition the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which an SDRAM memory system is used, one of skill in the art will appreciate that the teachings herein can be utilized for other memory systems (e.g., phase chance memory systems or memrister memory systems). Variations and modifications of the embodiments disclosed herein may be made based on the description set forth herein, without departing from the scope and spirit of the invention as set forth in the following claims.

What is claimed is:

1. A method comprising:
calculating a thread criticality of a thread of a plurality of threads executing on a processing system by counting critical sections executing by the thread, other threads of the plurality of threads waiting for execution of the critical sections executing by the thread, and other critical sections waiting for execution by the other threads; and
scheduling a memory request requested by the thread, the scheduling being based on the thread criticality.

2. The method, as recited in claim 1, wherein the thread executes nested critical sections and the thread is executing a plurality of critical sections.

3. The method, as recited in claim 1, further comprising:
updating the thread criticality in response to at least one of the thread being scheduled to execute on the processor, the thread entering a critical section, and the thread exiting a critical section.

4. The method, as recited in claim 1, further comprising:
decreasing the thread criticality in response to the thread exiting a critical section executing by the thread.

5. The method, as recited in claim 1, further comprising:
updating the thread criticality in response to a context switch.

6. The method, as recited in claim 1, wherein in response to at least a second memory request being associated with a second thread criticality having a same value as the thread criticality associated with the memory request, the scheduling comprises applying another scheduling rule to the memory request and the second memory request, to thereby identify the memory request as a highest priority memory request.

7. The method, as recited in claim 6, wherein the other scheduling rule includes at least one of a first-ready rule and a first-come first-served rule.

8. The method, as recited in claim 1, wherein the thread is associated with a first application of a plurality of applications executing on the processing system and the scheduling is further based on an indicator of application priority.

9. The method, as recited in claim 8, wherein the first application has a priority the same as a priority of a second application and the memory request is scheduled before any memory request in a memory request queue requested by a second thread of the plurality of threads and associated with the second application, in response to the thread criticality of the thread being greater than a second thread criticality of the second thread.

10. The method, as recited in claim 8, further comprising:
maintaining a data structure including a first entry corresponding to the thread and a second entry corresponding to at least one of a second thread of the plurality of threads and a critical section being executed by the thread, the second entry including an association to the first entry of the data structure,
wherein the thread criticality is based on the association of the first entry of the data structure to the second entry of the data structure.

11. The method, as recited in claim 10, wherein the thread criticality is based on a number of associations to the first entry included in the data structure, wherein the associations to the first entry of the data structure include at least one of direct pointers to the first entry of the data structure and indirect pointers to the first entry of the data structure.

12. The method, as recited in claim 10, wherein the data structure includes the second entry, the second entry corresponding to a critical section executing by the thread, the second entry including an association to the first entry and including an association to at least a third entry corresponding to a second thread.

13. The method, as recited in claim 10, wherein maintaining the data structure comprises updating the thread criticality in response to a change in association between the first entry and another entry of the data structure.

14. A processing system comprising:
a memory request buffer operable to store a memory request requested by a thread executing on the processing system;
a storage element operable to store a thread criticality indicator associated with the memory request, the thread criticality indicator being calculated by counting critical sections executing by the thread, other threads of the plurality of threads waiting for execution of the critical sections executing by the thread, and other critical sections waiting for execution by the other threads; and
a scheduler operative to schedule the memory request from the memory request buffer to a memory based on the thread criticality indicator.

15. The processing system, as recited in claim 14, further comprising:
a processor operable to provide the memory request and the thread criticality indicator to a memory controller including the scheduler.

16. The processing system, as recited in claim 14, further comprising a second storage element operable to store an indicator of application priority for an application associated with the thread.

17. The processing system, as recited in claim 14, further comprising:
a first set of instructions stored in a tangible computer-readable medium and operable on the processing system to maintain a data structure including a first entry corresponding to the thread, the first entry including an association to at least a second entry of the data structure,
wherein the thread criticality indicator is based on at least one entry of the data structure.

18. The processing system, as recited in claim 17, wherein the data structure includes a second entry corresponding to a critical section being executed by the thread and includes an association to the first entry.

19. The processing system, as recited in claim 18, wherein the second entry includes an association to at least a third entry corresponding to a second thread.

20. A non-transitory computer-readable medium encoding instructions comprising:
a first set of instructions operable on a processing system to maintain a data structure including a first entry corresponding to a thread, the first entry including an association to additional entries of the data structure; and
a second set of instructions operable on the processing system to calculate, based on the first entry and the additional entries of the data structure, a thread criticality indicator associated with a memory request, the additional entries including an entry for each critical section being executed on the processing system by the thread, an entry for each of other threads executing on the processing system being blocked from execution on the processing system by execution of the thread, and an entry for each of other critical sections waiting for execution by the other threads, wherein the thread criticality indicator is calculated by counting each entry of the additional entries of the data structure.

21. The non-transitory computer-readable medium encoding instructions, as recited in claim 20, wherein the thread criticality indicator reflects a number of associations to the first entry of the data structure, wherein the associations to the first entry of the data structure include at least one of direct pointers to the first entry of the data structure and indirect pointers to the first entry of the data structure.

22. The non-transitory computer-readable medium encoding instructions, as recited in claim 20, wherein maintaining the data structure comprises updating the thread criticality indicator in response to a change in association between the first entry and another entry of the data structure.

* * * * *